United States Patent [19]

Gerbasi

[11] E Patent Number: Re. 31,768

[45] Reissued Date of Patent: Dec. 18, 1984

[54] SORTING APPARATUS FOR COLLATING SIMPLEX AND DUPLEX COPIES

[75] Inventor: Dennis P. Gerbasi, West Webster, N.Y.

[73] Assignee: Xerox Corporation, Stamford, Conn.

[21] Appl. No.: 242,747

[22] Filed: Mar. 11, 1981

Related U.S. Patent Documents

Reissue of:

[64] Patent No.: 3,851,872
Issued: Dec. 3, 1974
Appl. No.: 341,448
Filed: Mar. 15, 1973

U.S. Applications:

[63] Continuation of Ser. No. 789,891, Apr. 22, 1974, abandoned, which is a continuation of Ser. No. 630,379, Nov. 10, 1975, abandoned.

[51] Int. Cl.[3] ..... B65H 29/60

[52] U.S. Cl. ..... 271/291; 271/65; 271/295

[58] Field of Search ..... 271/295, 294, 292, 291, 271/288, 298, 279, 65, 66; 270/58, 59, 60

[56] References Cited

U.S. PATENT DOCUMENTS

| | | | |
|---|---|---|---|
| 2,876,008 | 3/1959 | Mestre | 271/295 |
| 3,013,648 | 12/1961 | Kovach | 414/62 |
| 3,645,615 | 2/1972 | Spear | 271/9 X |
| 3,866,904 | 2/1975 | Stemmle | 271/291 |
| 3,908,978 | 9/1975 | Stemmle | 270/58 |
| 4,190,247 | 2/1980 | Guenther | 271/291 |
| 4,318,542 | 3/1982 | Altmann et al. | 271/291 X |

FOREIGN PATENT DOCUMENTS

| | | | |
|---|---|---|---|
| 1436096 | 1/1969 | Fed. Rep. of Germany | 271/295 |

OTHER PUBLICATIONS

Simpson, G. I., Jr. "Duplex Copier Incorporating Sorter-Collator," *IBM Technical Disclosure Bulletin*, vol. 14, No. 5, Oct. 1971, p. 1453.

*Primary Examiner*—Richard A. Schacher
*Attorney, Agent, or Firm*—Bernard A. Chiama

[57] ABSTRACT

Sorting apparatus for collating both simplex or side one up and duplex or side two up copies from a copying machine. The sorting apparatus includes tray assemblies arranged [axially] *radially* of a rotatable member adapted to rotate in clockwise and counterclockwise directions. A conveyor transports sheets toward a first or second feed zone adjacent the path of the tray assemblies. The direction of the tray assemblies and feed zone selected depend on the sorting mode of operation desired by the machine operator. The copy sets are unloaded at a gate into a tray member which is slideably reciprocated on receiving alternate sets to stagger the sets into separately identifiable stacks in the tray member.

8 Claims, 3 Drawing Figures

SORTING APPARATUS FOR COLLATING SIMPLEX AND DUPLEX COPIES

Matter enclosed in heavy brackets [ ] appears in the original patent but forms no part of this reissue specification; matter printed in italics indicates the additions made by reissue.

*This is a reissue continuation of application Ser. No. 789,891, filed Apr. 22, 1977, now abandoned which is a reissue continuation of application Ser. No. 630,379, filed Nov. 10, 1975 now abandoned.*

This invention relates to apparatus for sorting copies advanced from a high speed copier/duplicator into collated sets in both simplex and duplex modes of operation.

In copier/duplicator systems sorters normally include bin modular units with a multitude of trays as described in U.S. Pat. Nos. 3,561,754, 3,356,362, 2,876,008, 2,951,697, and 3,076,647. These sorters are suitable for sorting and collating copy sheets bearing information on one side only, but are not entirely satisfactory for sorting and collating copy sheets bearing information on either one or both sides referred to as duplexing.

The present invention is, generally speaking, a sorter/collator adapted for universal usage with the copier/duplicator of all types including simplex and duplex modes of operation. More than this the invention does not require an inverter device which is used to invert sheets for different sorting modes of operations.

It is therefore a general object of this invention to improve distribution of copy sheets.

It is another object of this invention to enable the distribution of copy sheets in collated sets in simplex and duplex sorting modes of operation.

It is still a further object of the invention to sort and collate copy sheets in both simplex and duplex sorting modes of operation without the need of an inverter device.

The above and added advantages of the present invention will be more apparent after reading the following detailed description which refers to accompanying drawings in which.

Figure 1:
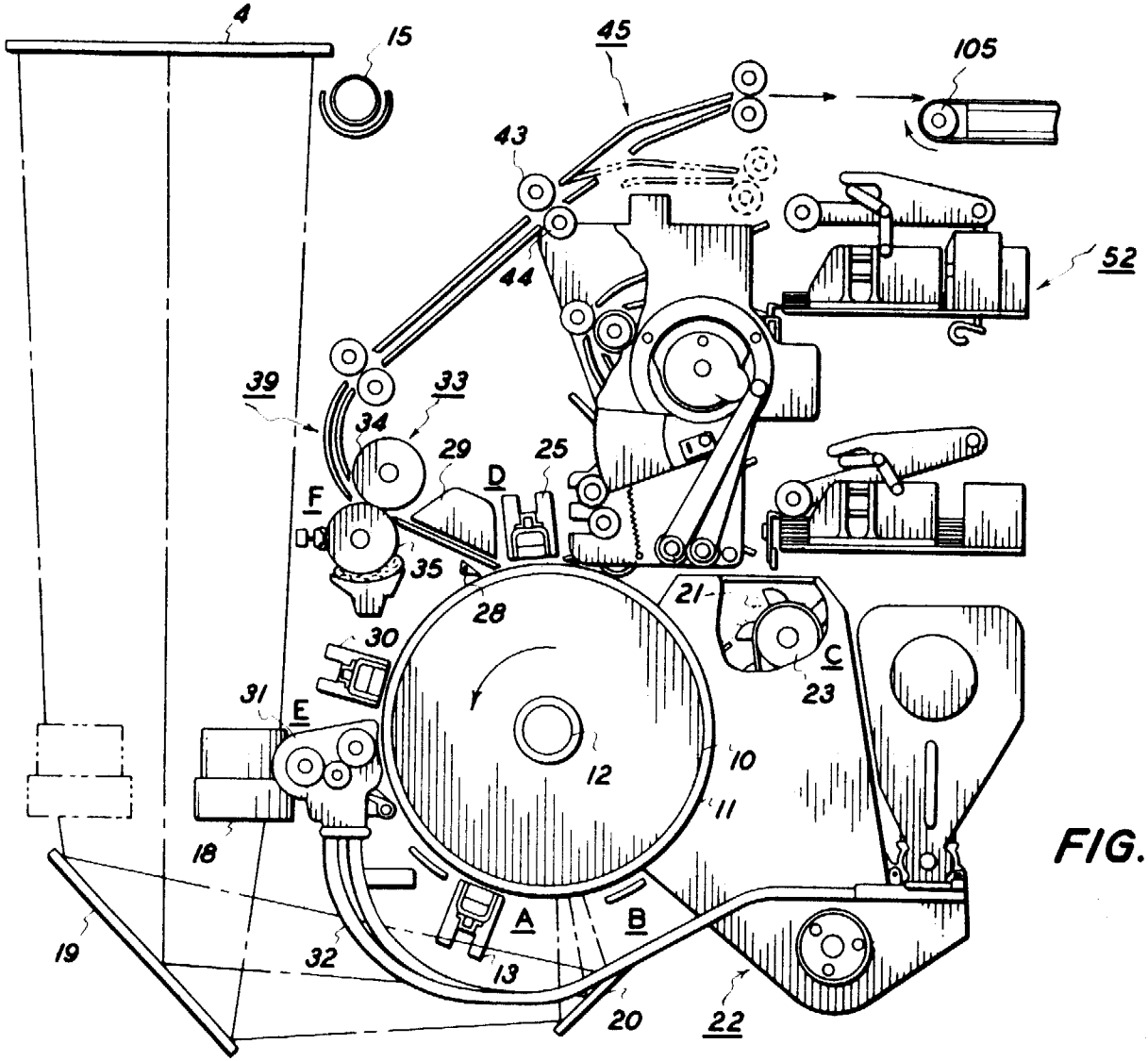
FIG. 1 is a [schematice] *schematic* view of a xerographic copier/duplicator machine of the type used with the sorting apparatus according to the present invention.
Figure 2:
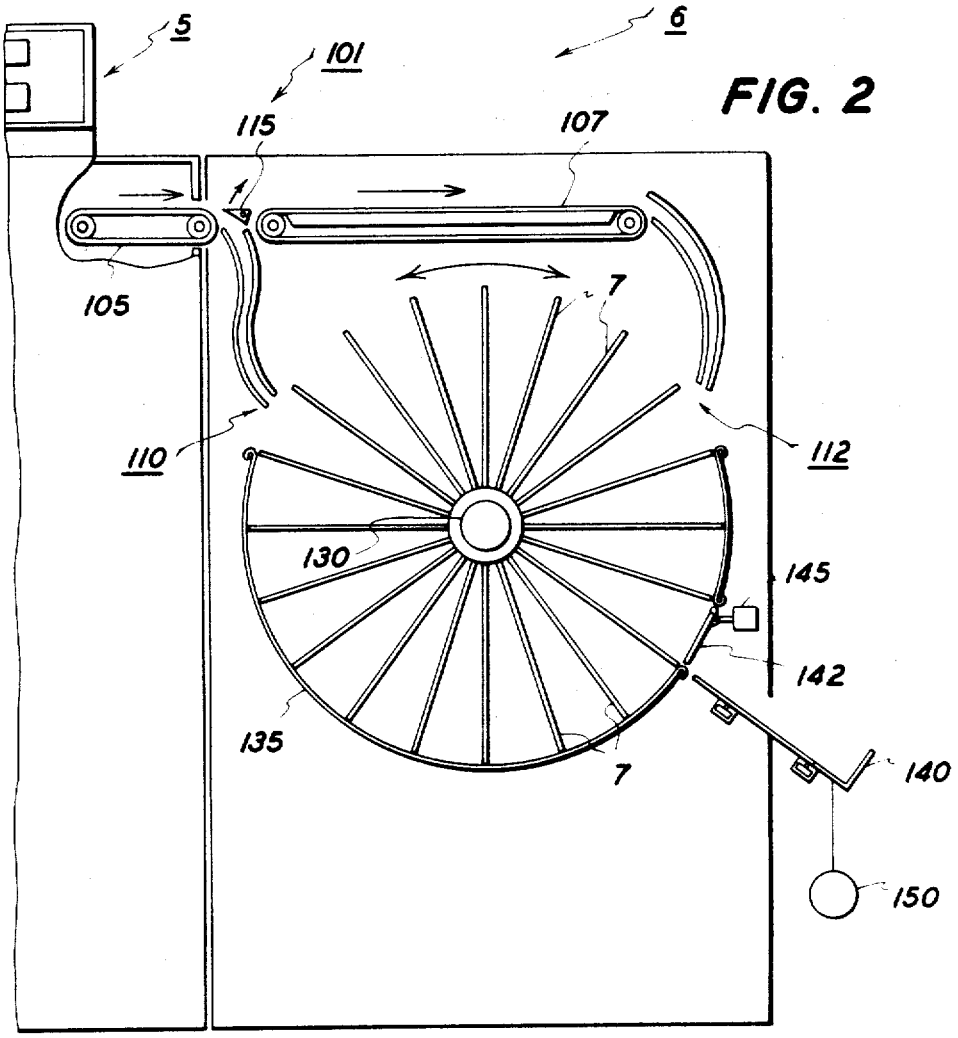
FIG. 2 is a side view of sorting apparatus according to the present invention.

FIG. 1 shows a schematic of the copier/duplicator system generally designated 2 including a copier machine 3, which is a high speed copier/duplicator capable of producing simplex or duplex copies at the option of a machine operator. The copier machine 3 has a platen 4 for receiving documents to be reproduced, and a control panel 5 (FIG. 2) which includes various control knobs, buttons, and switches for selecting various modes of operation such as simplex and duplex copies and the number of copies to be reproduced. In accordance with the invention, the copier/duplicator system includes a sorting apparatus 6 having tray assemblies 7 (FIG. 2).

The copier/duplicator system includes an automatic xerographic apparatus which includes a photosensitive plate including a photoconductive layer 10 that is placed over a conductive backing. The plate is formed in the shape of a drum 11 and the drum mounted upon a shaft 12 that is journaled for rotation in the in the machine frame. Basically, the xerographic drum is rotated in the direction indicated so as to pass sequentially through a series of xerographic processing stations. The photosensitive drum and the xerographic processing apparatus are driven at predetermined speeds relative to each other from a drive system (not shown) and the operation thereof coordinated in order to produce proper cooperation of the various processing mechanisms.

The original, to be reproduced, is placed upon a transparant horizontally supported platen 4 and the original scanned by means of a moving optical scanning system and to produce a flowing light image of the original. The scanning system includes an elongated horizontal extended aperture lamp 15 and a moveable lens element 18.

The lamp and lens element moves in coordination across the object supported upon the platen to focus successive incremental [bans] *bands* of illumination reflected from the object onto the moving drum surface at synchronous speeds therewith. The optical path is folded by means of a pair of image mirrors 19 and 20 interposed between the lens and the drum surface, the drum is first uniformly charged by means of a corona generator 13 positioned on charging station A. Under the influence of the flowing light image, the uniformly charged photoconductive surface is selectively dissipated in the non-image areas to form what is commonly known as a "latent electrostatic image."

The latent electrostatic image is carried on the drum surface from the exposure station into the developing station C. The developing station primarily is comprised of a developer housing 22 adapted to support a supply of two-component developer material 21 therein. The developer material is transported by means of a bucket system 23 from the bottom of the developer housing to an elevated position where the material is delivered into the active developement zone. The developer material is caused to flow downwardly in contact with the upwardly moving drum surface under closely controlled conditions wherein charged toner particles are attracted from the developer mix into the image areas on the plate surface thus making the image visible.

The moving drum surface next transports the developed xerographic image to a transfer station D. Cut sheets of final support material are also moved into the transfer station, the backside of the copy sheet is sprayed with an ion discharge from a transfer corotron 25 inducing on the sheet a charge having a polarity and magnitude sufficient to attract the toner material from the drum surface to the final support material. This induced charge also electrostatically tacks the final support material to the drum surface. In order to remove the copy sheet from the drum surface a stripper finger 28 is positioned downstream from the transfer corotron. The finger is arranged to move between the drum surface and the copy sheet and lifts the sheet from the drum surface and the copy sheet is directed along a predetermined path of travel into contact with a stationary vacuum transport 29.

Although a preponderance of the toner material is transferred from the drum surface to the copy sheet during the transfer process, invariably some residual toner remains behind on the drum surface after transfer. This residual toner is transported on the drum surface into a cleaning station E where it is brought under the influence of a cleaning corotron 30 adapted to neutralize the electrostatic charge tending to hold the residual toner to the drum surface. The neutralized toner is mechanically cleaned from the drum surface by means of a blade or the like and the toner collected within a housing 31. A conveyor moving in an endless loop through tubes 32 transports the collected residual toner back to the developer housing where it is deposited within the developer mix so that it can be once agains re-used in the xerographic developing process.

The copy sheet, which has been removed from the drum surface after the transfer operation, is moved along stationary transport 29 into fusing station F. The fuser 33 is basically made up of an upper fuser roll 34 and a lower fuser roll 35 mounted in operative relation to each other and arranged to coact so as to support a sheet of material in pressure driving contact therebetween. The lower roll is heated. As the heated roll is rotated in the direction indicated the heated surface of the lower roll is pressed into intimate contact with the image face of the support sheet. Mechanical and heat energy transported from the roll surface to the support sheet permanently bond the toner particles to the support material.

Upon leaving the fuser, the fixed copy sheet is passed through a [curvalinear] *curvilinear* sheet guide system, generally referred to as 39, into cooperating advancing rolls 43 and 44. At this point, depending on whether simplex or duplex mode of operation is selected, the copy sheet is either forwarded directly to the sorter or into the upper supply tray 52 by means of a moveable sheet guide 45 before entering the sorter, respectively.

It is believed that the foregoing description is sufficient for purposes of the present application to show the general operation of a xerographic reproducing machine. For a more detailed explanation of the copier/duplicator xerographic components reference is made to U.S. Pat. No. 3,645,615 entitled Copying Apparatus.

Sorting apparatus 6 comprises a transport assembly 101 which includes a transport 105 and 107 for transporting simplex or side one up and duplex side two up copy sheets from the xerographic processing apparatus into different sheet feed zones 110 and 112, respectively. A deflector gate member 115 serves to direct sheets towards sheet discharge zone 110 when actuated in one position and towards transport 107 and sheet discharge zone 112 when actuated in another position. The actuation of gate member 115 is controlled by any suitable device such as a solenoid which is energized when selecting the desired sorting mode of operation on control panel 5.

Sheet discharge zones 110 and 112 are arranged to feed sheets into tray assemblies 7 mounted [axially] *radially* on a rotatable member 130. Rotatable member 130 is mounted on the frame to rotate in both clockwise and counterclockwise directions depending on the sorting mode of operation. It should be understood that the sorting could be accomplished with the tray assemblies rotating in one direction only, but this would require more time. Rotatable member 130 is driven by a reversible motor (not shown) which drives member 130 [is] *in* a predetermined direction according to the mode of selection on the control panel. The drive may be incremental or continuous as desired. By this structure the sheets are collated and sorted for both simplx and duplex modes of operation.

Figure 3:
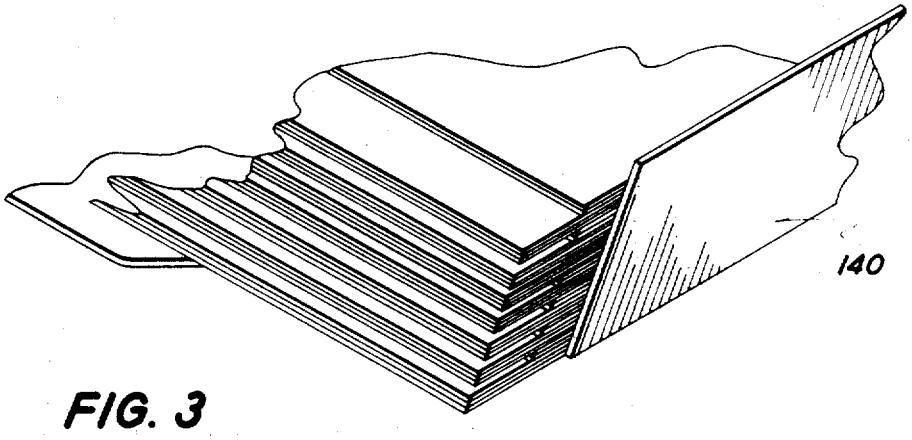
FIG. 3 is an exploded view illustrating staggered and separately identifiable collated sets in the receiving tray.

The tray assemblies have one or more bands or guides 135 for retaining the collated sheets until they are in a position adjacent an unloading tray 140 where a gate member 142 releases the collated set of sheets, during the unloading cycle which follows the sorting cycle, with signals supplied to a gate actuator 145. Unloading tray 140 is slideably mounted on guides and is adapted to move in reciprocating fashion upon receiving each set of copy sheets from a tray assembly. Any suitable drive can be used for this purpose as a drive motor 150. By this structure a set separation of the copy sets into staggered identifiable stacks is accomplished (FIG. 3).

In operation for simplex sorting the copy sheets are transported with side one up by transport 105 and directed towards sheet discharge zone 112 which feeds them into the tray assemblies 7 moving in a clockwise direction. In the case of duplex sorting the sheets are directed with side 1 face down and side 2 face up towards sheet discharge zone 110 which feeds them into the tray assemblies moving in a [clockwise] *counterclockwise* direction.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention.

What is claimed is:

1. In a copier/duplicator machine which produces simplex and duplex copy sheets to be sorted an improved sorting apparatus for sorting in simplex and duplex modes of operation comprising:

a frame;

a rotatable member supported in said frame;

an array of tray members arranged [axially] *radially* of said rotatable member;

drive means for rotating said rotatable member in one direction when sorting simplex copies and the opposite direction when sorting duplex copies;

conveyor means including a deflector member for directing copy sheets towards one feed zone adjacent the path of said tray members on one side and another feed zone adjacent the path of said tray members on another side;

control means for supplying signals to said drive means and said deflector member to rotate said tray member in a predetermined direction and direct sheets to a selected feed zone depending on whether simplex or duplex sorting mode of operation is desired;

gate means positioned adjacent to the path of said tray members adapted to unload a collated set of sheets from each tray member into a receiving tray;

wherein said receiving tray is slideable across the sheet discharge path and means to slide the receiving tray in reciprocating fashion upon receiving each copy set.

*2. A sheet receiving apparatus for a reproducing machine comprising:*

*at least one sheet receiving bin, said at least one bin including first and second side members for supporting a sheet in said bin;*

*means for pivotally supporting said side members for movement between a first orientation wherein said side members are generally inclined from the vertical*

*in one direction and a sheet in said bin is supported by said first side member, and a second and different orientation wherein said side members are generally inclined from the vertical in the opposite direction and a sheet in said bin is supported by said second side member;*

*means for positioning said side members in said first orientation or in said second orientation; and*

*means for conveying said sheet to said at least one bin when said side members are supported in either of said first or second orientations.*

*3. An apparatus according to claim 2 including a plurality of sheet receiving bins.*

*4. An apparatus as in claim 2, wherein said sheet comprises a copy sheet and wherein said reproducing machine can selectively make copy sheets bearing information on a single side or on two sides, and wherein said conveying means conveys said single-sided copy sheets to said bin with said side members positioned in said first orientation or said two-sided copy sheets to said bin with said side members positioned in said second orientation, whereby sheets stacked in said bins are properly collated.*

*5. In a reproducing machine which can selectively make copy sheets bearing information on a single side or on two sides, an improved sheet receiving apparatus capable of producing collated sets in both a single side or two side operation comprising:*

*at least one sheet receiving bin, said bin including first and second side members for supporting a sheet in said bin;*

*means for pivotally supporting said side members for movement between a first orientation wherein said side members are generally inclined from the vertical in one direction and a sheet in said bin is supported by said first side member, and a second and different orientation wherein said side members are generally inclined from the vertical in the opposite direction and a sheet in said bin is supported by said second side member;*

*means for positioning said side members in said first orientation or in said second orientation;*

*means for conveying sheets to said bin to cause said sheet to be delivered to said bin when said side members are supported in either of said first or second orientation; and*

*control means for controlling the positioning of said side means in said first or in said second orientation depending on whether single or two side operation is utilized by a machine operator whereby collated sets are produced for both operations.*

*6. An apparatus according to claim 5 including a plurality of sheet receiving bins.*

*7. In a reproducing machine which can selectively make copy sheets for simplex and duplex operation an improved sheet receiving apparatus capable of receiving sheets in collated sets in both simplex and duplex operation comprising:*

*at least one movable sheet receiving bin, said bin including first and second side members for supporting a sheet in said bin;*

*means for moving said side members in either a first direction to one side of the vertical wherein a sheet received is supported by said first side member or second direction to the other side of the vertical wherein a sheet received is supported by said second side member;*

*means for conveying said sheets to said bin, said means including deflector means positioned in the sheet path and mounted to move to a first position to deflect sheets along a first path towards said bin as said side members are moved in a first direction and to a second position to deflect sheets along a second path as said side members are moved in a second direction; and*

*control means for controlling the direction of movement of said side members and the position of said deflector means depending on whether simplex or duplex operation is desired.*

*8. Apparatus according to claim 7 including more than one sheet receiving bin arranged radially on an axis.*

* * * * *